358-140. XR 2,784,250 SR CROSS REFERENCE SEARCH ROOM

March 5, 1957 P. SCHAGEN 2,784,250

FILM RECORDING FROM CATHODE RAY TUBE DURING FLYBACK BY INFRA-RED RELEASE OF IMAGE ENERGY

Filed March 1, 1952

INVENTOR
Pieter Schagen
By [signature]
Agent

United States Patent Office 2,784,250

Patented Mar. 5, 1957

2,784,250

FILM RECORDING FROM CATHODE RAY TUBE DURING FLYBACK BY INFRA-RED RELEASE OF IMAGE ENERGY

Pieter Schagen, Eindhoven, Netherlands, assignor to Hartford National Bank and Trust Company, Hartford, Conn., as trustee Application March 1, 1952, Serial No. 274,346

Claims priority, application Netherlands March 15, 1951

5 Claims. (Cl. 178—7.4)

Figure 1:
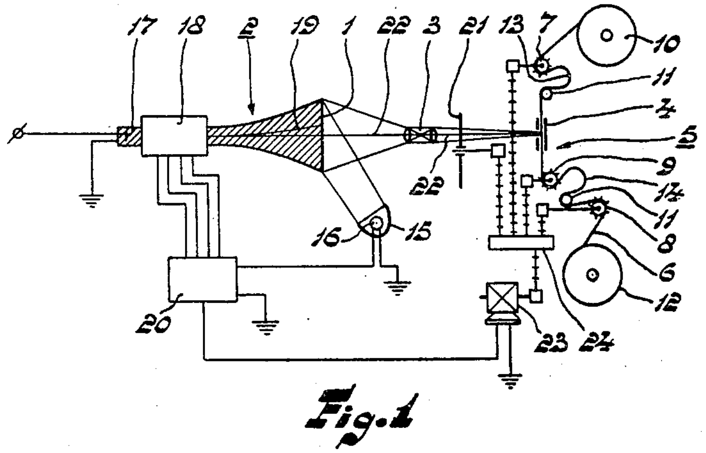

This invention relates to methods of reproducing television images formed by means of electrical image impulses on the viewing screen of a cathode-ray tube as well as to devices for carrying out this method and to picture film records made with use of this method.

If topical subjects are being televised it may be found important to make television images reproducible, the television images then being recorded on a carrier either at a transmitting or at the receiving end. Reproduction of television images may also be desirable if the television image is to be relayed at either the transmitting or the receiving end with the aid of a scanning system operating with a number of lines different from the scanning system which forms the image to be re-transmitted on the screen of the cathode-ray tube. In the last-mentioned case the same transmission may then be viewed by receivers having different scanning systems.

Several systems are known for recording television images according to which the images produced on the screen of the "monitor"—i. e. a cathode-ray tube on whose screen the image to be transmitted is produced for testing purposes—are recorded by means of a film camera. In this case various difficulties arise due to the different ways in which the visual image is formed. In film-recording the image appears for a short time as a whole on the picture gate and is then allowed to act upon the sensitized layer of the film, whereas the image on the screen of the monitor is formed by the electron beam trace. Since, for practical reasons, the speed at which the film is intermittently movable in the picture gate displacement is limited, the film is precluded from recording within the short time elapsing between the instant at which a preceding image is formed in its entirety on the screen of the monitor and the instant at which another image is formed on the screen. With the said intermittent displacement of the film it is therefore necessary for the film to be already driven during production of the image on the screen of the monitor, during which displacement the optical path is interrupted. Hence, this known method involves loss of intelligence.

This difficulty may be mitigated with the use of an optical compensation system, through which the reflected image of the screen image is moved in the direction of travel of the film in such manner that the film is allowed to be driven at a constant speed and the optical path is not interrupted. Although no intelligence is lost when this system is used, this solution is not inviting because the optical compensation system is rather complicated and its operation is both difficult and expensive.

The method according to the invention overcomes the disadvantages inherent in known methods, since a latent image is formed on the screen provided with luminescent material, which material is activated by means of a quantity of energy supplied in the form of a light flash within the time elapsing between the production of the last image point of the screen image and the first image point of a succeeding screen image (flyback time). The image thus made visible in its entirety is optically reproduced on a carrier within the flyback time, whereupon the optical path is interrupted during the production of the next following latent image on the luminescent screen. It is desirable to interrupt the optical path in order that during the afterglow of the next following image to be built up on the luminescent screen, the preceding screen image reproduced on the carrier shall not be adversely affected.

It is evident that for this purpose luminescent materials are used which, in building up the screen image by the electron beam, are capable of radiating (in the form of light) a portion of the energy supplied and of storing another portion of this energy.

When the material is irradiated with light of long wavelength, the stored energy is released in the form of visible light of shorter wavelength, which is termed here "activation."

The materials referred to are known per se. They are used, for example, in radar location systems where they are included in the screen of a cathode-ray tube and the screen-image to be displayed is built up in a latent form, whereupon it is activated by irradiation with infra-red light and thus made visible, the luminescent screen being, for example, provided with strontium sulphide containing small quantities of samarium and cerium.

Since in the method according to the invention the screen-image made visible in its entirety is reproduced during the flyback time, which is only a fraction of the time (1/25 sec.) required for producing the whole screen-image, there is ample time in which to interrupt the optical path for the desired period of time during the production of the next following screen-image.

The carrier may, for example, consist of an intermittently driven film comprising a sensitized layer, which film according to the invention, is driven only during the interception of the recording beam. However, the sufficiently short time of exposure available within the flyback period and the choice of the light sensitive material of the film permit the film to be continuously driven, the speed of the film in the picture gate being accurately matched to the time required for building up a complete image on the luminescent screen of the cathode-ray tube. In either case, the film speed need, on the one hand not be as high as is usual with film-cameras and on the other hand no intelligence is lost, since the flyback time is amply sufficient to reproduce a screen image activated within said time on the film. Moreover, the use of optical compensation is not required when the films are continuously driven.

In the cases referred to, when use is made of a scanning system having a different number of lines, the carrier may be the photo-cathode of an image iconoscope. the method according to the invention is then characterised in that the image made visual in its entirety is reproduced on the photo-cathode and in that during the time of interruption of the optical path the electrical charge image formed by the photo-cathode on the mosaic screen of the iconoscope is scanned with a number of lines different from that employed in forming the initial image on the image screen of the cathode-ray tube.

Figure 2:
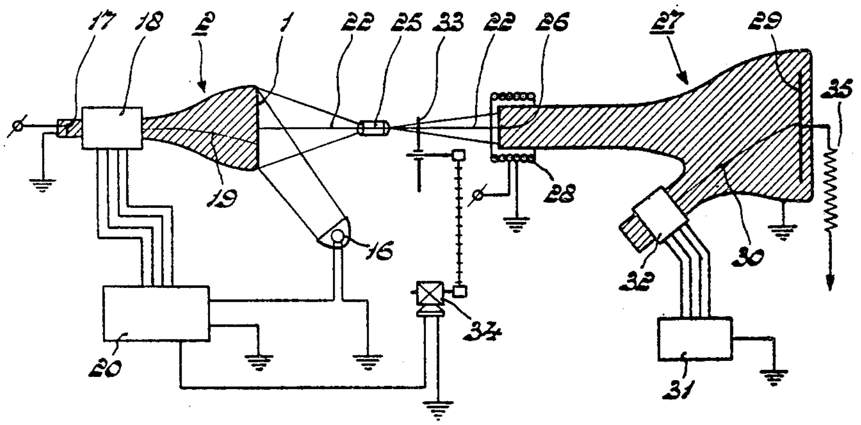

In order that the invention may be readily carried into effect it will now be described in detail by giving several examples which are illustrated in the accompanying drawing, in which:

Fig. 1 represents a device by means of which a television program is recorded, according to the invention, on a film; and Fig. 2 represents a device by means of which, according to the invention, the number of lines of the incoming image signal is translated into a signal with a different number of lines.

In Fig. 1, the reference numeral 1 denotes the viewing screen of a cathode-ray tube 2, which screen is provided with luminescent material, for example, strontium sulphide and small quantities of samarium and cerium. Optical means 3 are so arranged relative to the viewing screen as to obtain a sharp reproduction of the picture gate 4 of a film camera 5. By means of continuously moving sprockets 7, 8 and the discontinuously rotating maltese cross sprocket 9, a film is conveyed in the usual manner from the unwinding spool 10 by way of guide rollers 11 in front of the picture gate to the winding up spool 12, the intermittent movement of the film being established by the sprocket 9 and loops 13, 14 in the film respectively located before and behind the picture gate. A source of energy, including a reflector 15, in the form of a flash lamp 16 emitting infra-red light when supplied with electric current, is so arranged relative to the viewing screen 1 as to permit the screen to be wholly irradiated with infra-red light. The device operates as follows: Electrical image impulses obtained, for example, by means of television recording apparatus at the scene, are supplied to the control grid 17 of tube 2. The electron beam 19, modulated in accordance with the electrical image impulses and deflected by means of a system 18, forms point by point an image on the viewing screen 1 of tube 2. This image partly consists of a latent image and partly of a directly radiated visible image, since a portion of the supplied electric energy is stored in the material of the screen, whereas the remaining energy is translated into visible light. The electron beam is deflected by means of the deflection system 18 which is controlled by a generator 20 converting the synchronisation impulses of the incoming signal into deflection signals such that the latent image is built up in 1/25 second, which time elapses between the formation of the first image point of a screen image and the first image point of a succeeding screen image, a few milliseconds (the so-called "flyback time") elapsing between the formation of the last image point of a preceding screen image and the first image point of a succeeding screen image. Within the last-mentioned period the generator 20 supplies a very short current impulse to the flash lamp 16, so that the viewing screen 1 is so intensively irradiated with infra-red light as to release the energy stored in the luminescent material and to make the latent image visible. Of course, the energy supplied must be sufficient to release substantially all of the stored energy, thus preventing the succeeding screen image formed by the electron beam 19 from being affected.

The luminescent material for the viewing screen 1 is preferably so chosen that the afterglow time of the visible image is sufficiently short to prevent additional blackening (due to afterglowing image points of the preceding screen image) on the film during the infra-red flash which occurs during the flyback.

As an alternative, a material may be utilized whose afterglow time exceeds the flyback time but is less than 1/25 second. In this event, a compensating correction of the intensity of the image signal appearing at the control grid 17 of cathode-ray tube 2 should be made.

The screen image thus made visible in its entirety is imaged by optical means 3 on the film which is still at this instant (flyback time) in the picture gate 4. Within the time of building up the succeeding latent screen image (1/25 second) the film must be displaced by the height of one film image in the picture gate, so that upon exposure by the next following screen image, which is again made visible by means of an infra-red light flash, a new reproduction is made on the film. Since the film needs be still in the film gate only during the flyback time there is ample opportunity for displacement of the film. This has the advantage that the speed of the film may be chosen to be equal to or smaller than the normal film speed, while no intelligence is lost, since the image formed on the screen is imaged in its entirety on the film.

In order to prevent image points lighting up in forming the next following image on the viewing screen 1 of tube 2 from being imaged on the film moving or not moving in the picture gate 4, a device in the form of a rotating apertured disc 21 (shutter) is provided through which the recording light beam 22 is interrupted during the time elapsing between the formation of the first image point and the last image point of the said screen image. The camera motor 23 is driven by generator 20, and the transmission 24 coupled to the motor for moving the film and the shutter 21 is synchronized with the image-scanning of the electron beam in the cathode-ray tube, so that at the instant at which the beam has produced the last image point of a screen image, the film has moved over a distance corresponding to the height of one image in the picture gate and during the flyback of the beam 19 the lamp 16 emits a flash and the position of the shutter 21 is such that the recording light beam 22 is not intercepted.

Fig. 2 shows a cathode-ray tube 2 of the aforesaid type, corresponding parts bearing the same reference numerals. Optical means 25 are again so arranged relative to the viewing screen 1 as to obtain a sharp reproduction thereof on a carrier in the form of a photo-cathode 26 of an image iconoscope 27. By electron optical means 28, an electrical charge image of the screen-image of the cathode-ray tube 2 imaged on the photo-cathode 26 is formed on the mosaic screen 29 of the iconoscope. This charge image is scanned by means of an electron beam 30, which is deflected by a system 32 fed by a deflection voltage generator 31, with a different number of lines from that with which the image is formed on the viewing screen of cathode-ray tube 2. The operation of this device will be briefly described. Electrical image impulses are supplied to the control grid 17 of tube 2. The electron beam 19 modulated in accordance with the electrical impulses and deflected by the system 18 forms point by point a latent image on the viewing screen in the aforesaid manner. By means of a flash of infra-red light emitted by a flash lamp 16 within the flyback of the electron beam 19, the visible screen image is imaged in its entirety on the photocathode 26. In the time during which the succeeding latent image is formed on the screen 1 of cathode-ray tube 2, the electric charge image immediately recorded by electron optical means 28 on the mosaic screen 29, is scanned by the electron beam 30 controlled by the deflection system 32. In order to prevent light from image points lighting up on the image screen 1 during formation of the next following latent screen image from striking the photocathode 26 during undesired periods and from adversely affecting the reproduction of the preceding screen image on the mosaic screen 29, a shutter 33 is again provided which is driven from a motor 34 controlled by the generator 20 so that the recording light beam 22 is passed only during the flyback of the electron beam 19 in the cathode-ray tube 2.

Consequently, the electrical image impulses derived at 35 from the mosaic screen 29 of the iconoscope lag in time exactly 1/25 second—i. e., the time elapsing between the formation of the first image point of a preceding screen image and the first image point of the following screen image—behind the electrical image impulses fed to the control grid 17 of tube 2.

This method has the advantage that in the event of a neighboring television transmission system operating with a number of lines which one different from the number of one's own system, the latter is capable of adapting the program of the first-mentioned transmission system to the reception of the television receivers matched to its own number of lines.

What I claim is:

1. In a television system a cathode-ray receiving tube provided with a viewing screen formed of luminescent material which renders a latent image visible when activated, means to periodically scan said screen with the cathode-ray in accordance with television signals from a first image point to a last image point to form a latent image on said screen, means to activate said material in the flyback intervals from the last point on one image to the first point on the succeeding image to render said latent image visible during said intervals, a carrier, optical means for directing said visible image in a path onto said carrier during said intervals, and means to block said optical path during said scanning periods.

2. A television system as set forth in claim 1 wherein said carrier is constituted by motion picture film.

3. In a television system, a cathode-ray receiving tube provided with a viewing screen formed by luminescent material which renders a latent image visible when activated by infra-red radiation, means periodically to scan said screen with the cathode-ray in accordance with television image impulses from a first image point to a last image point to form a latent image on said screen, an infra-red source, means to energize said source to irradiate said screen and activate said material in the flyback intervals from the last point of one image to the first image point of a succeeding image to render said latent image visible during said intervals, a carrier, optical means to direct said visible image in a path onto said carrier, and shutter means to block said optical path during said scanning periods.

4. A system, as set forth in claim 3, wherein said carrier is a moving film.

5. A system, as set forth in claim 3, wherein said carrier is constituted by the photocathode of an image iconoscope provided with a mosaic screen on which said photocathode forms a charge image, said iconoscope including means to scan said mosaic screen during the blocking of said optical path with a number of lines different from that used in producing the initial image on said cathode-ray tube.

References Cited in the file of this patent

UNITED STATES PATENTS

| | | |
|---|---|---|
| 2,468,452 | Leverenz | Apr. 26, 1949 |
| 2,468,714 | Leverenz | Apr. 26, 1949 |
| 2,499,181 | Downes et al. | Feb. 28, 1950 |
| 2,513,176 | Homrighous | June 27, 1950 |